(12) United States Patent
Markert et al.

(10) Patent No.: US 7,603,927 B2
(45) Date of Patent: Oct. 20, 2009

(54) MANIPULATOR WITH AUTOMATIC CONTROL, ESPECIALLY FOR THE FOOD INDUSTRY

(75) Inventors: Joachim Markert, Augsburg (DE); Günther Merk, Altenmünster (DE)

(73) Assignee: KUKA Roboter GmbH, Augsburg (DE)

( * ) Notice: Subject to any disclaimer, the term of this patent is extended or adjusted under 35 U.S.C. 154(b) by 705 days.

(21) Appl. No.: 10/975,778

(22) Filed: Oct. 28, 2004

(65) Prior Publication Data
US 2005/0092122 A1    May 5, 2005

(30) Foreign Application Priority Data
Oct. 29, 2003  (DE) ................. 103 50 801

(51) Int. Cl.
*B25J 17/00* (2006.01)
(52) U.S. Cl. ............. 74/490.01; 414/735; 901/15; 901/29
(58) Field of Classification Search ............ 74/490.01, 74/490.05, 490.06; 414/735; 901/15, 28, 901/29
See application file for complete search history.

(56) References Cited

U.S. PATENT DOCUMENTS

| | | | | |
|---|---|---|---|---|
| 4,904,514 A | * | 2/1990 | Morrison et al. | 428/53 |
| 6,039,068 A | * | 3/2000 | Tessier et al. | 137/377 |
| 6,279,412 B1 | * | 8/2001 | Beaulieu et al. | 74/490.01 |
| 6,543,307 B2 | * | 4/2003 | Ambrose | 74/490.03 |
| 6,634,851 B1 | | 10/2003 | Bonora et al. | |
| D491,964 S | * | 6/2004 | D'Andreta | D15/199 |
| D496,952 S | * | 10/2004 | D'Andreta | D15/199 |
| 2005/0092122 A1 | * | 5/2005 | Markert et al. | 74/490.01 |

FOREIGN PATENT DOCUMENTS

| | | |
|---|---|---|
| DE | 94 01 663.1 | 7/1994 |
| DE | 101 46 196 | 11/2002 |
| EP | 0 937 551 | 8/1999 |
| EP | 0 988 939 | 3/2000 |
| WO | WO 96/08347 | 3/1996 |

OTHER PUBLICATIONS

Fanuc Robotics LR Mate XP-002309472, Oct. 23, 2003.

* cited by examiner

*Primary Examiner*—David M Fenstermacher
(74) *Attorney, Agent, or Firm*—McGlew and Tuttle, P.C.

(57) ABSTRACT

An automatic manipulator, such as a multiaxial industrial robot, with a carrying component structure (support structure) for transmitting forces between individual members of the automatic manipulator. The entire support structure is formed from a material that is resistant with respect to external effects, such as moisture or the like. The material of the support structure may be, in particular, a material that is suitable for use in contact with foods, such as stainless steel, so that the automatic manipulator according to the present invention can be used reliably and without additional costly protective measures in environments in which there is a risk for contamination, such as in the food industry.

12 Claims, 1 Drawing Sheet

MANIPULATOR WITH AUTOMATIC CONTROL, ESPECIALLY FOR THE FOOD INDUSTRY

CROSS REFERENCE TO RELATED APPLICATIONS

This application claims the benefit of priority under 35 U.S.C. § 119 of German patent application DE 103 50 801.5 filed Oct. 29, 2003 the entire contents of which are incorporated herein by reference.

FIELD OF THE INVENTION

The present invention pertains to a handling gear or manipulator with automatic control according to EN ISO 8373, especially a multiaxial industrial robot, with a carrying component structure (support structure) for transmitting forces between individual members of the automatic manipulator. The present invention pertains, in particular, to an automatic automatic manipulator, such as a manipulator with automatic control according to EN ISO 8373.

BACKGROUND OF THE INVENTION

Automatic automatic manipulator of the above-described type, such as multiaxial industrial robots, hereinafter called robots for short, are regularly used in the food industry and the pharmaceutical industry, as in many other branches of industry as well. It shall be ensured because of the strict hygienic regulations applicable that the robots used do not become a source of contamination of their working environment. Such contamination is caused, on the one hand, by lubricant or abraded particles, which are released from the interior the robot and enter the environment. On the other hand, the robot is always contaminated in the working areas from the outside, for example, by food residues and/or moisture, which may lead to contamination of and/or damage to the robot.

To avoid the above-mentioned problem, it was proposed in EP 0 937 551 A1 that the frame and the carousel of a multi-axial industrial robot be surrounded with a covering made of a material that is insensitive to the external effects and is easy to clean, such as stainless steel or the like. The fact that the covering provided additionally represents an extra design effort (in terms of the material), which is associated with correspondingly increased manufacturing costs, shall be considered to be particularly disadvantageous in such a solution. In addition, additional parts of the robot, such as the rocker, the robot arm or the robot hand, continue to be unprotected, and they represent a potential risk for contamination.

WO 96/08347 shows a robot arm arrangement that is surrounded with washable housing parts having a smooth surface for cleaning purposes. The above-described drawbacks occur in this case as well.

Furthermore, it was proposed in EP 0 988 939 A1 that exposed surfaces of an industrial robot be coated with a layer consisting of a synthetic resin or the like, which has antimicrobial components. The additional step of coating the robot represents a disadvantageous extra cost for preparing the coating in this case as well. Furthermore, the protective action of such a coating may decline over time and after repeated cleaning operations, e.g., with high-pressure cleaning devices. Moreover, a local damage to the protective coating is possible.

SUMMARY OF THE INVENTION

The basic object of the present invention is to provide an automatic manipulator that can be used in an environment in which there is a risk for contamination and that reliably avoids the above-described drawbacks.

This object is accomplished according to the present invention in an automatic manipulator of the type described in the introduction such that the support structure is formed of stainless steel.

Since the support structure of the automatic manipulator itself is made of stainless steel it exhibits passive and high resistance to corrosive attack by organic acids, weak mineral acids and atmospheric oxidation. This eliminates the additional and costly application of coverings, coatings, envelopes or the like for avoiding contamination, so that the automatic manipulator according to the present invention can also be used under conditions under which high hygienic requirements are to be met, as in the food industry or the pharmaceutical industry. A preferred variant of the automatic manipulator according to the present invention makes therefore provisions for the support structure to be made of a material that is suitable for use in contact with foods. According to an extremely preferred variant of the present invention, the support structure is made of stainless steel.

To prevent dirt, moisture or the like from accumulating in cavities of the support structure and foci of contamination, such as nests of bacteria or the like from forming, provisions are, furthermore, additionally made in a preferred embodiment for hermetically sealing cavities of the support structure that are dictated by the design by welding together, for example, two or more partial shells of the automatic manipulator, which form a support part, such as the robot arm or the rocker, or by bracing them against each other with the arrangement of a seal. The support part may preferably also be cast as a one-piece part, in which case only the opening for removing the casting core is to be closed by a cover. "Hermetically closed" always means, in particular, a fluid-tight sealing, which reliably prevents both contaminants from escaping from the automatic manipulator to the outside into the environment and the entry of ambient air into the automatic manipulator, so that no foci of contamination, such as nests of bacteria or deposits of dirt, etc., can be formed there.

If the support structure has cavities dictated by the design with an opening, the variant of the subject of the present invention provides for the openings to be closed with the use of suitable static seals.

Furthermore, a dynamic or rotating seal may be arranged in a suitable form between two support parts in case of relative mobility, such as on hinges, in order to prevent dirt from penetrating. A double seal is preferably used in this case.

The invention relates to manipulators with automatic control according to EN ISO 8373 and particularly to a multiaxial industrial robot.

Other advantages and properties of the present invention will appear from the following description of an exemplary embodiment on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
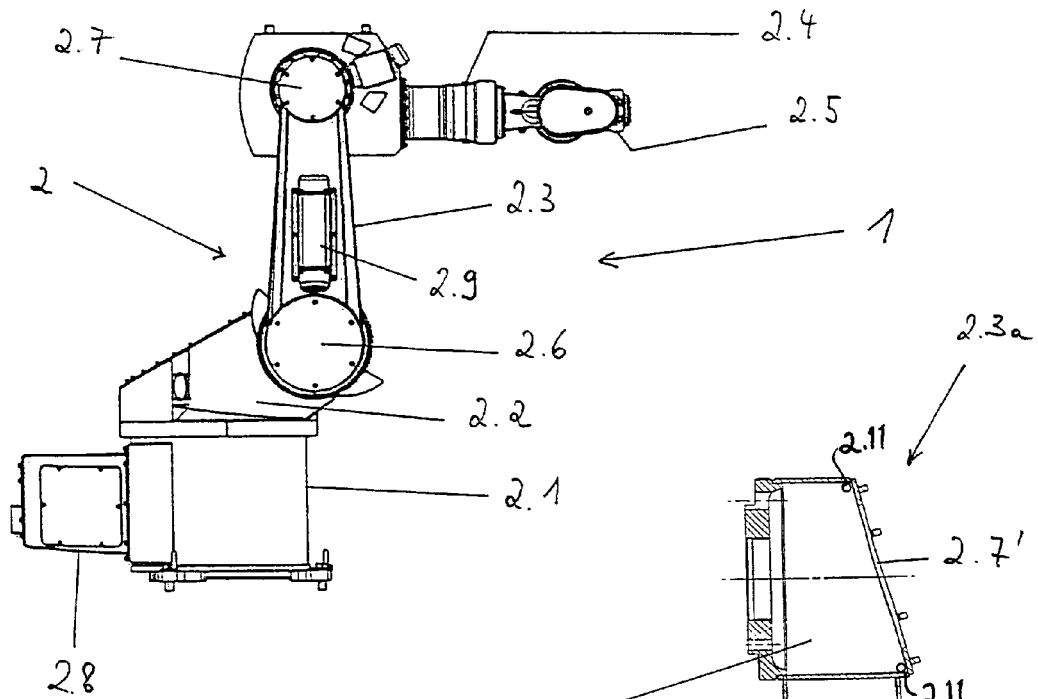
FIG. 1 is a side view of an embodiment of an automatic manipulator according to the present invention.

FIG. 1 shows a side view of an embodiment of an automatic manipulator according to the present invention in the form of a multiaxial industrial robot 1, especially according to the standard EN ISO 8373. The robot 1 has a support structure 2 with a frame 2.1, a carousel 2.2, a rocker 2.3, an arm 2.4 and a hand 2.5, which is manufactured according to the present invention completely of a material that is resistant to external effects, such as moisture or the like, for example, stainless steel. The support structure 2 is thereby formed from a material that is suitable for use in contact with foods. That is, the material is resistant so as not to react with the environment (moisture, oxygen) and the material does not poison food or otherwise make the food unfit for human consumption upon contact of the food with the material. The food does not corrode the material and the material does not react with organic material. Dirt or soiling of the robot by food may easily be removed. Accordingly, the robot may be easily cleaned. Other elements of the robot 1, such as the covers 2.6, 2.7, which are arranged, for example, in the joint areas between the carrousel 2.2 and the rocker 2.3 or the rocker 2.3 and the arm 2.4, or covering hoods 2.8, 2.9, e.g., in the area of the frame and/or of the arm 2.4, are made of stainless steel as well.

The robot 1 according to the present invention can consequently be used without additional protective measures, such as the installation of covers or envelopes, in work areas in which there is a risk for contamination, because it can be cleaned from the outside especially easily and reliably and, furthermore, it cannot be damaged by dirt and moisture from the outside.

Figure 2:
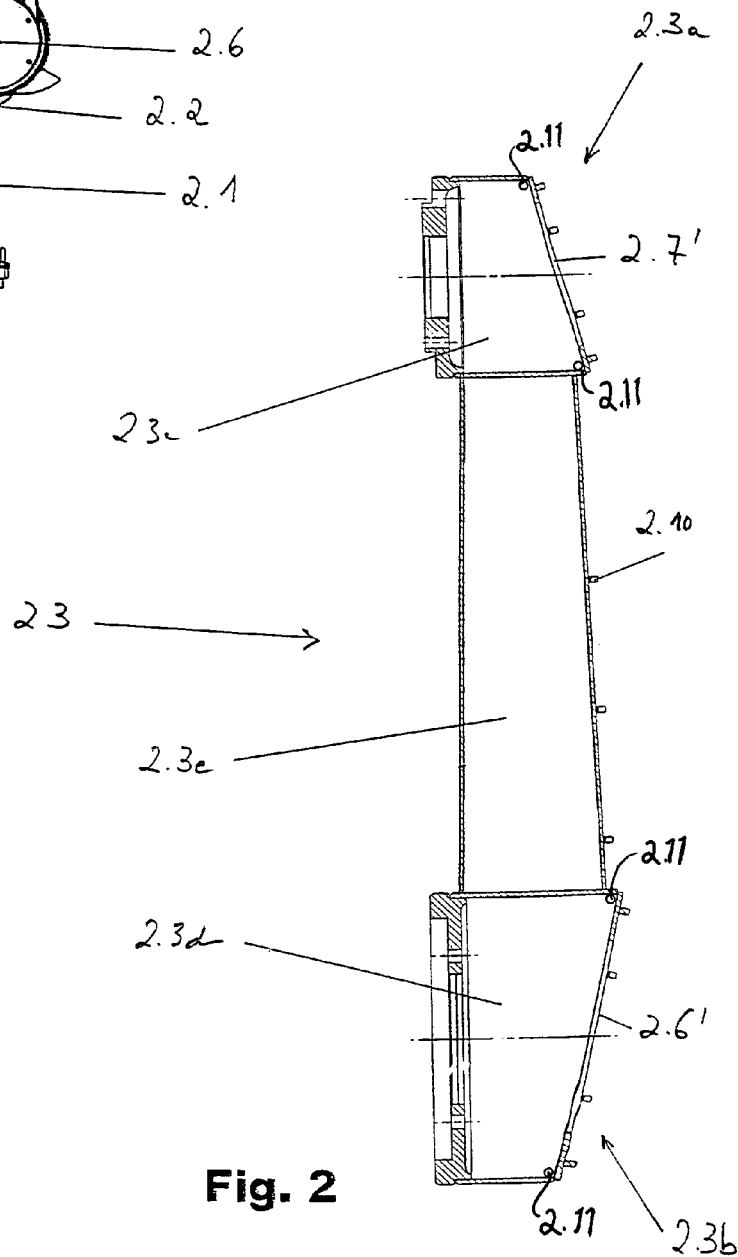
FIG. 2 is a longitudinal section through a part of the support structure of the automatic manipulator according to FIG. 1.

FIG. 2 shows a longitudinal section of a part of the support structure 2 of the robot 1 according to FIG. 1, namely, the rocker 2.3 of the robot 1. In its upper area 2.3a as well as in its lower area 2.3b, the rocker 2.3 has a cavity which is due to the design in the form of an interior space 2.3c and 2.3d, respectively, with respective openings 2.7' and 2.6' necessary for the function, in order to keep, for example, joint areas of the robot accessible for maintenance and repair purposes. The interior spaces 2.3c and 2.3d and their respective openings 2.6', 2.7' are closed according to FIG. 1 with stainless steel covers 2.6, 2.7 with the use of suitable static seals 2.11. The seals 2.11 are annular or ring shaped. Moreover, the rocker 2.3 of the robot 1 according to the present invention has, according to FIG. 2, a hermetically closed interior space 2.3e, which has no function during the operation of the robot 1 and is therefore permanently and hermetically closed according to the present invention already at the time of the manufacture of the rocker 2.3. Thus, potentially contaminating nests of bacteria or the like cannot form according to the present invention especially in functionally insignificant interior spaces 2.3e of the support structure 2 of the robot 1.

The components of the support structure 2 are, furthermore, preferably designed such that no nests of dirt can form on their outer surfaces and that liquids can flow off unhindered. Additional envelopes on the support structure can thus be eliminated.

The projections 2.10, which are also shown in FIG. 2, are used to fasten the covers 2.6, 2.7 and the covering hoods 2.9 (see FIG. 1).

While a specific embodiment of the invention has been shown and described in detail to illustrate the application of the principles of the invention, it will be understood that the invention may be embodied otherwise without departing from such principles.

LIST OF REFERENCE NUMBERS

1 Robot
2 Support structure
2.1 Frame
2.2 Carousel
2.3 Rocker
2.3a, 2.3b End of rocker
2.3c, 2.3d, 2.3e Interior space
2.4 Arm
2.5 Hand
2.6, 2.7 Cover
2.6', 2.7' Opening
2.8, 2.9 Covering hood
2.10 Projection
2.11 Seal (annular—ring/circular shaped)

What is claimed is:

1. A multiaxial industrial robot automatic manipulator, comprising:

a carrying component supporting structure for transmitting forces between individual members of the automatic manipulator, said supporting structure being formed of stainless steel;

a first stainless cover having a first cover outer surface consisting of stainless steel;

a first static sealing element;

a second stainless steel cover having a second cover outer surface consisting of stainless steel; and a second static sealing element, wherein the supporting structure includes a stainless steel rocker portion, said stainless steel rocker portion having an inner surface defining an upper recess and a lower recess, said lower recess receiving said first stainless steel cover and said first static sealing element such that said first stainless steel cover and said first static sealing element hermetically seal said lower recess, said upper recess receiving said second stainless steel cover and said second static sealing element such that said second stainless steel cover and said second static sealing element hermetically seal said upper recess, said individual members of the automatic manipulator including a stainless steel frame having an outer frame surface consisting of stainless steel, a stainless steel carousel portion having an outer carousel surface consisting of stainless steel, a stainless steel arm portion having an outer arm surface consisting of stainless steel and a stainless steel gripping portion having an outer gripping surface consisting of stainless steel, said stainless steel frame being connected to said stainless carousel portion, said stainless steel rocker portion being connected to said stainless steel carousel portion and said stainless steel arm portion such that said stainless steel rocker portion is movable relative to said stainless steel carousel portion, said stainless steel arm portion being movable relative to said stainless steel rocker portion, said stainless steel gripping portion being connected to said stainless arm portion such that said stainless steel gripping portion is movable relative to said stainless steel arm portion.

2. An automatic manipulator in accordance with claim 1, wherein the supporting structure defines an outer surface consisting of stainless steel, said supporting structure being suitable for use in contact with foods.

3. An automatic manipulator in accordance with claim 1, further comprising one or more hermetic closures, wherein said supporting structure defines one or more cavities, said one or more cavities being hermetically closed by said one or more hermetic closures.

4. An automatic manipulator in accordance with claim 1, further comprising covers and static seals, wherein said supporting structure defines one or more openings, said openings being closed with said covers and said static seals.

5. An automatic manipulator in accordance with claim 1, further comprising seals, wherein said carrying component supporting structure comprises support parts defining gaps therebetween, said gaps being sealed with said seals.

6. An automatic manipulator in accordance with claim 5, wherein said seals are double seals.

7. An automatic manipulator in accordance with claim 1, wherein said stainless steel does not poison food or make the food unfit for human consumption when said stainless steel contacts the food.

8. An automatic manipulator in accordance with claim 2, wherein said stainless steel does not include nickel or said supporting structure has no nickel at an outer surface thereof.

9. An automatic manipulator, comprising:
a first member;
a second member movable relative to said first member;
a carrying component supporting structure for transmitting forces between said first member and said second member, said supporting structure being formed of stainless steel to define an outer surface consisting of stainless steel; and
a first stainless cover having a first outer cover surface consisting of stainless steel and a second stainless steel cover having a second outer cover surface consisting of stainless steel, wherein the supporting structure includes a stainless steel rocker portion, said stainless steel rocker portion having an inner surface defining an upper recess and a lower recess, said lower recess receiving said first stainless steel cover such that said first stainless steel cover hermetically seals said lower recess, said upper recess receiving said second stainless steel cover such that said second stainless steel cover hermetically seals said upper recess.

10. A multiaxial industrial robot automatic manipulator, comprising:
a stainless steel base element having an outer base surface consisting of stainless steel;
a stainless steel swivel base element connected to said stainless steel base element, said stainless steel swivel base element having an outer swivel base surface consisting of stainless steel, said stainless steel swivel base element being movable relative to said stainless steel base element;
a stainless steel rocker arm connected to said stainless steel swivel base element such that said stainless steel rocker arm is movable relative to said stainless steel swivel base element, said stainless steel rocker arm having an outer rocker arm surface consisting of stainless steel;
a stainless steel carrying arm connected to said stainless steel rocker arm such that said stainless steel carrying arm is movable relative to said stainless steel rocker arm, said stainless steel carrying arm having a carrying arm outer surface consisting of stainless steel;
a stainless steel gripping arm connected to said stainless steel carrying arm such that said stainless steel gripping arm is movable relative to said stainless steel carrying arm, said stainless steel gripping arm having a gripping arm outer surface consisting of stainless steel, said stainless steel rocker arm defining a carrying component supporting structure such that said stainless steel rocker arm transmits forces between said stainless steel swivel base element and said stainless steel carrying arm.

11. An automatic manipulator in accordance with claim 10, further comprising:
a first stainless cover having a first cover outer surface consisting of stainless steel;
a first static sealing element;
a second static sealing element; and
a second stainless steel cover having an outer second cover surface consisting of stainless steel, said stainless steel rocker arm having an inner surface defining an upper recess and a lower recess, said upper recess being located opposite said stainless steel carrying arm, said lower recess being located opposite said stainless steel swivel base element, said lower recess receiving said first stainless steel cover and said first static sealing element such that said first stainless steel cover and said first static sealing element hermetically seal said lower recess, said upper recess receiving said second stainless steel cover and said second static sealing element such that said second stainless steel cover and said second static sealing element hermetically seal said upper recess.

12. An automatic manipulator in accordance with claim 11, further comprising:
a first stainless steel covering hood connected to said stainless steel frame, said first stainless steel covering hood having a first covering hood outer surface consisting of stainless steel;
a second stainless steel covering hood having a second covering hood outer surface consisting of stainless steel, said inner surface of said stainless steel rocker arm defining a middle opening, said middle opening receiving said second stainless steel covering hood such that said second stainless steel covering hood hermetically seals said middle opening.

\* \* \* \* \*